United States Patent [19]

Janssen

[11] 4,247,656
[45] Jan. 27, 1981

[54] POLY(URETHANE-ISOCYANURATE) FOAMS

[75] Inventor: Edward W. Janssen, Roseville, Minn.

[73] Assignee: Minnesota Mining and Manufacturing Company, St. Paul, Minn.

[21] Appl. No.: 20,311

[22] Filed: Mar. 14, 1979

Related U.S. Application Data

[63] Continuation of Ser. No. 783,178, Mar. 31, 1977, abandoned, which is a continuation of Ser. No. 380,703, Jul. 19, 1973, abandoned, which is a continuation of Ser. No. 178,311, Sep. 7, 1971, abandoned.

[51] Int. Cl.³ .................. C08G 18/14; C08G 18/48; B32B 5/20
[52] U.S. Cl. .................. 521/174; 156/331; 428/310; 428/313; 521/114; 521/116; 521/117; 521/125; 521/128; 521/905; 521/914; 528/70
[58] Field of Search .............. 521/114, 116, 117, 125, 521/128, 174, 905, 914; 528/70

[56] References Cited

U.S. PATENT DOCUMENTS

| | | | |
|---|---|---|---|
| 3,137,662 | 6/1964 | Recktenwald | 521/117 |
| 3,280,049 | 10/1966 | Hyre et al. | 521/117 |
| 3,635,848 | 1/1972 | Rambosek | 260/2.5 AB |
| 3,697,485 | 10/1972 | Rambosek et al. | 260/77.5 NE |
| 3,880,782 | 4/1975 | Rambosek | 260/2.5 AW |
| 3,928,258 | 12/1975 | Alexander | 521/914 |

FOREIGN PATENT DOCUMENTS 2034171  3/1970  Fed. Rep. of Germany ... 260/2.5 AW

OTHER PUBLICATIONS

Ind. & Eng. Chem., vol. 56, Sep. 1964, pp. 26–31, by Scharz.
Dahm, Cellular Plastics, Nat. Academy of Sciences, Publ. 1462, pp. 52–63.

Primary Examiner—H. S. Cockeram
Attorney, Agent, or Firm—Cruzan Alexander; Donald M. Sell; Carolyn A. Bates

[57] ABSTRACT

Novel poly(urethane-isocyanurate) foams and their preparation are described. These foams are low density, non-friable, heat stable, polymeric reaction products of polyisocyanate and polyoxyalkylene polyol, the reaction products having a cross-link density in the range of about 1 cross-link per 400 to 750 atomic weight units. Processes are also provided for forming a foamed isocyanate-derived polymer on an oil-contaminated substrate and obtaining a firm bond of the polymer to the substrate.

8 Claims, 4 Drawing Figures

U.S. Patent     Jan. 27, 1981     4,247,656
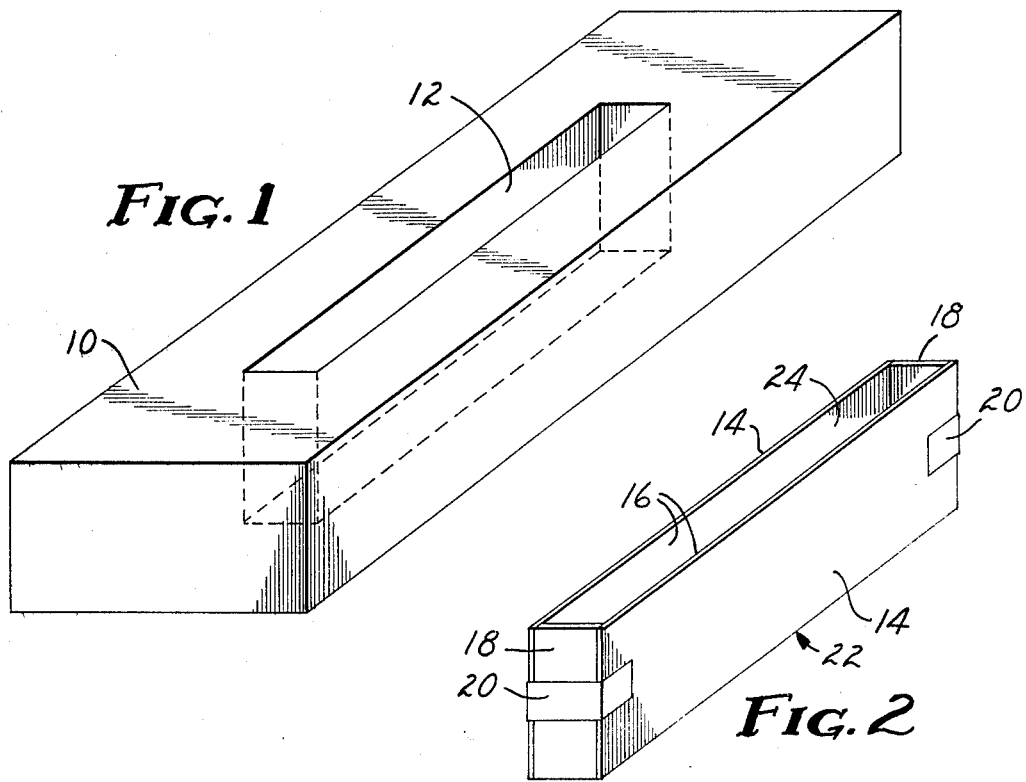
FIG. 1
FIG. 2
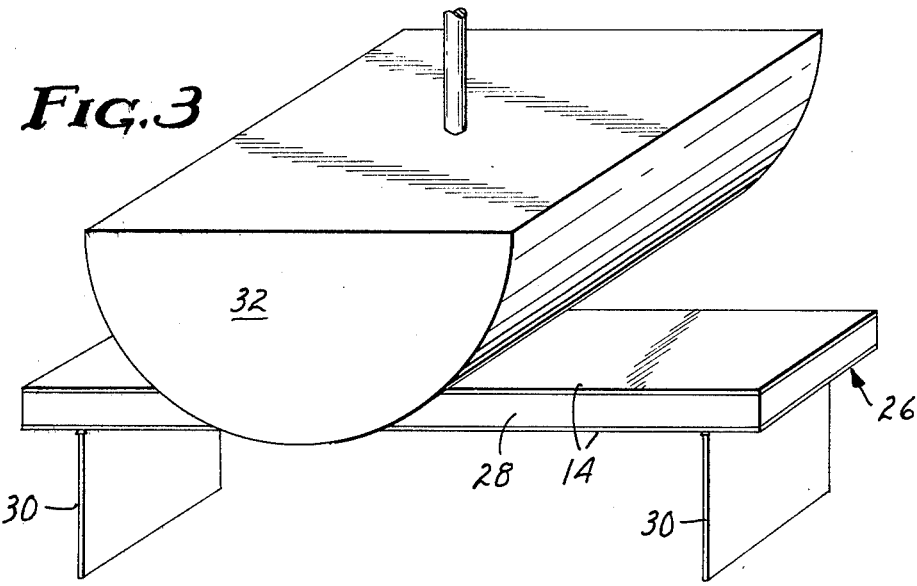
FIG. 3
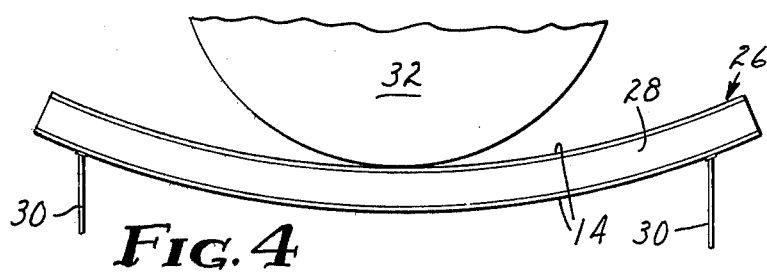
FIG. 4

POLY(URETHANE-ISOCYANURATE) FOAMS

Related Cases

This application is a continuation of application Ser. No. 783,178 filed Mar. 31, 1977, now abandoned, which is a continuation of application Ser. No. 380,703 filed July 19, 1973, now abandoned, which is a continuation of application Ser. No. 178,311 filed Sept. 7, 1971, now abandoned.

FIELD OF THE INVENTION

This invention relates to poly(urethane-isocyanurate) foams and their preparation. In another aspect, this invention relates to a structural laminate and its preparation.

BACKGROUND OF THE INVENTION

Polyurethanes and polyisocyanurates are known generally in the art as being polyisocyanate-derived polymeric products. These products can be foamed or non-foamed, the former type receiving significant interest as an insulative and cushioning material in many and various industries during the past few years. The foamed polyurethanes are generally prepared by reacting the polyisocyanate with the polyol in the presence of a blowing agent (e.g. a normally gaseous fluorocarbon or carbon dioxide), the blowing agent expanding the reaction product during the reaction to produce a foamed or cellular structure. The polyurethane foams are characteristically and inherently non-heat-stable. Foamed polyisocyanurates are generally produced by reacting polyisocyanates in the presence of a trimerization catalyst and a blowing agent, the isocyanurate moiety imparting greater heat stability to the polymer. Where the polyisocyanate is a urethane prepolymer, or where it is trimerized in the presence of polyol, the resulting polymer contains urethane as well as isocyanurate linkages. The foamed products can be of high or low density, depending upon the amount of blowing agent used, and either rigid or flexible, depending upon the particular reactants used.

These foams can be generally referred to as poly(urethane-isocyanurates) or as urethane-modified polyisocyanurate foams. It is within the field of urethane-modified polyisocyanurate foams (sometimes referred to herein as polyisocyanurate foams) that the present invention resides.

Although the heat stability and structural strength of the semi-rigid and rigid polyisocyanurate foams have made them quite useful for many applications, such foams, particularly low density foams (e.g. 4 lbs./ft$^3$.) have exhibited characteristically poor adhesion to substrates such as sheet steel containing contaminants such as oil, grease, or drawing compounds when foamed in situ. Consequently, it has always been necessary to remove such contaminants as oil or grease from the substrate surface before making the foam in situ in order to obtain suitable adhesion to such surface. Although more satisfactory results were obtained when forming high density foams (as opposed to low density foams) on oil-contaminated substrates, the expense and weight attendant with high-density foams are serious competitive disadvantages. Because completely removing oil and other such contaminants from substrate surfaces (e.g. metal) before making a foam on such substrates is highly impractical, and many times impossible, separate bonding agents or adhesives have been resorted to in order to anchor the foams to the substrates. Such approach is both time-consuming and expensive and often limits the structural strength of the structure to that possessed by the adhesive or other bonding agent. Consequently, there has been a need for a heat-stable semi-rigid or rigid low density foam which would readily adhere in a permanent manner to oil-contaminated substrates notwithstanding subjection of the structure to elevated temperatures, such as those used in baking a paint coating on the exposed substrate surface. The present invention provides such a foam.

SUMMARY OF THE INVENTION

In accordance with the invention there are provided tough, non-friable, low-density, semi-rigid foams which are particularly useful in structural applications where impact resistance or energy absorption characteristics are required, e.g. as reinforcement means in structural panels, such as automobile doors. These foams, in addition to having the light weight and cost advantage of low density foams, exhibit the desirable heat-resistance and toughness necessary for use in most structural panels. These foams also have special utility in applications where the foam must adhere to substrates (e.g. metal) contaminated with oil, grease, drawing compounds or the like.

The novel foams are tough, foamed, polymeric reaction products of polyisocyanate and polyoxyalkylene polyol, the NCO/OH equivalent ratio of such reaction mixtures being 1.3/1 to 5/1, the polymeric reaction product having isocyanate-derived linkages which are isocyanurate, urea (if water is used as a blowing agent) and urethane linkages. The isocyanurate linkages result from the trimerization of isocyanate moieties, the urethane linkages result from the reaction of the isocyanate moieties with the hydroxyl moieties of the polyol, and the urea linkages result from the reaction of the isocyanate moieties with the water used as a blowing agent. The reaction product exhibits a beam flexure characteristic of at least 100 lbs. with at least 1 inch deflection. The beam flexure characteristic, defined in detail later in this application, is a measure of the combined effect of the tensile strength, compression strength, shear strength and adhesion properties of the foam. The cross-link density of these reaction products is in the range of about 1 cross-link per 400 to 750 atomic weight units.

These foamed polymeric reaction products are prepared by foaming the precursor reaction mixtures thereof in the presence of certain surface active agents which not only function as foam stabilizers but also enhance firm bonds of the foams to oily substrates when foaming the reaction ingredients in situ. Of course, the polymeric reaction products of this invention will also adhere firmly to non-contaminated substrates when foamed in situ.

One class of useful foam stabilizers comprises fluorine-containing compounds having a plurality of active hydrogen atoms. These fluorine-containing compounds can be described as fluoroaliphatic radical-substituted active hydrogen-containing compounds. Another class of useful foam stabilizers comprises certain silicone compounds which can be described as polysiloxane polyalkyleneoxide block copolymers.

Processes are also provided for (1) forming a foamed polymer on an oil-contaminated substrate and obtaining a firm bond of the polymer to the substrate, and (2)

bonding two substrates together using the foamed polymers of this invention where at least one of such substrates is contaminated with oil or grease.

DETAILED DESCRIPTION OF THE INVENTION

In making polyisocyanurate foams in accordance with this invention, the precursor reaction mixtures are foamed in the presence of certain foam stabilizers. The precursor reaction mixtures comprise polyisocyanate, polyoxyalkylene polyol, isocyanate trimerization catalyst, blowing agent and foam stabilizer. These reaction mixtures are ordinarily provided as two-part compositions, "Part A" normally comprising polyol, catalyst, foam stabilizer and blowing agent with "Part B" normally comprising the polyisocyanate. Depending upon solubility, the foam stabilizer may be contained in "Part B" rather than in "Part A."

In addition to providing non-friable, semi-rigid foamed polymeric reaction products the invention provides a process for forming a foamed isocyanate-derived polymer on a substrate having a thin film of oil thereon and obtaining a firm bond of said polymer to the substrate. The process comprises (a) applying to the oily surface of the substrate a mixture comprising a polyisocyanate, a polyoxyalkylene polyol, a trimerization catalyst, a blowing agent and a foam stabilizer of the formula $(R_f)_m Q_z(H)_n$ wherein $R_f$ is a fluorinated, saturated aliphatic radical, H is an active hydrogen atom, Q is a linkage free of active hydrogen atoms and having a valence of m+n, m is an integer which is at least 1, n is an integer of at least 2, and z is an integer of 1-3; and (b) allowing said mixture to react in situ to form a tough, low density foamed polymer. Preferably the foam stabilizer used in this process is of the formula $(R_f)_m Q_z[(RO)_x H_y]_n$ wherein $R_f$ is a fluorinated, saturated aliphatic radical, R is a polyvalent, saturated aliphatic hydrocarbyl radical having 2 to 10 carbon atoms, H is an active hydrogen atom Q is a linkage free of active hydrogen atoms and having a valence of m+n, m is an integer of 1 or more, n is an integer of 1 or more, z is an integer of 1—3, x is an integer of at least 25, y is an integer of 1-5, and the product (n)(y) is at least 2.

In accordance with the aforementioned process one obtains a substrate (e.g. metal, fiberboard, plaster board or the like) which is coated with a tough, non-friable, heat-resistant semi-rigid foam. The so-coated substrate is useful as a thermal insulation article.

The invention also provides a process for bonding an oil-contaminated substrate to a second substrate to form a composite article, the process comprising (a) applying between the oil-contaminated substrate and the second substrate, and in contact therewith, a mixture comprising a polyisocyanate, a polyoxyalkylene polyol, a trimerization catalyst, a blowing agent and a foam stabilizer of the formula $(R_f)_m Q_z(H)_n$ wherein $R_f$ is a fluorinated, saturated aliphatic radical, H is an active hydrogen atom, Q is a linkage free of active hydrogen atoms and having a valence of m+n, m is an integer which is at least 1, n is an integer of at least 2, and z is an integer of 1-3; and (b) allowing said mixture to react in situ to form a tough, low density foamed polymer.

Of course, the second substrate itself may be contaminated with oil, in which case the invention provides a process for bonding two oil-contaminated substrates together.

The present invention also provides a foamable composition comprising a mixture of (a) organic polyisocyanate,
(b) polyoxyalkylene polyol,
(c) a trimerization catalyst,
(d) a blowing agent, and
(e) a foam stabilizer of the formula $(R_f)_m Q_z(H)_n$ wherein $R_f$ is a fluorinated, saturated aliphatic radical, H is an active hydrogen atom, Q is a linkage free of active hydrogen atoms and having a valence of m+n, m is an integer which is at least 1, n is an integer of at least 2, and z is an integer of 1-3; wherein the NCO/OH equivalent ratio in said mixture is 1.3/1 to 5/1; and wherein said mixture, upon reaction, forms a tough, non-friable foamed polymeric reaction product having a cross-link density of about 1 cross-link per 400 to 750 atomic weight units.

It is highly preferred that at least 95% of the oxyalkylene units in the polyol used in this composition be oxypropylene units. It is also highly preferred to use a foam stabilizer of the formula $(R_f)_m Q_z[(RO)_x H_y]_n$ wherein $R_f$ is a fluorinated, saturated aliphatic radical, R is a polyvalent, saturated aliphatic hydrocarbyl radical having 2 to 10 carbon atoms, H is an active hydrogen atom, Q is a linkage free of active hydrogen atoms and having a valence of m+n, m is an integer of 1 or more, n is an integer of 1 or more, z is an integer of 1-3, x is an integer of at least 25, y is an integer of 1-5, and the product (n)(y) is at least 2.

The polyisocyanates which are used in making the polyisocyanurate foams can be described as conventional organic polyisocyanates, including monomeric and polymeric aliphatic and aromatic polyisocyanates. Examples of suitable polyisocyanates include tolylene-2,4-diisocyanate, tolylene-2,6-diisocyanate, diphenylmethane-4,4'-diisocyanate, 3-methyldiphenylmethane-4,4' diisocyanate, hexamethylene-1,6-diisocyanate, 1,1-bis(4-isocyanatophenyl)cyclohexane, m- or p-phenylene diisocyanates, chlorophenylene-2,4-diisocyanate, naphthalene-1,5-diisocyanate, diphenyl-4,4' diisocyanate, methylene bis(4-phenyl) isocyanate, 3,5'-dimethyldiphenyl-4,4' diisocyanate, and diphenyl ether-4,4'-diisocyanate. Triisocyanates which may be used include diphenylether-2,4,4'triisocyanate. Polymeric polyisocyanates can also be used, such as polyaryl polyisocyanate, which is sold under the trademarks MRS and PAPI. The polyaryl polyisocyanates are preferred. The polyisocyanates can be used in either a crude or purified form. A list of useful commercially available polyisocyanates is found in "Encyclopedia of Chemical Technology," by Kirk and Othmer, 2nd Edition, Vol. 12, pp. 46–47, Interscience Pub., (1967), and in Appendix A of Polyurethanes: Chemistry and Technology, Part I, Saunders and Frisch, Interscience Publishers, 1962.

Suitable polyols useful for making the foamed polymeric reaction products of the invention can be described as polyoxyalkylene polyols. The preferred polyols are those in which more than half of the oxyalkylene groups are oxypropylene groups, (—O—CH(CH$_3$)CH$_2$—) and even more preferred polyols are those in which at least 95% or more of the oxyalkylene groups are oxypropylene groups. The presence of oxyethylene units in the polyol increases the moisture sensitivity of the polyol and the resultant polyisocyanurate foam. Polyoxyalkylene polyols containing halogen atoms or phosphorus atoms are useful for making flame-retardent foams.

The polyol used can be a single compound or a mixture of two or more polyols. The polyols can be prepared by reaction of a 1,2-alkylene oxide with a simple di- or polyhydroxy compound, such as ethylene glycol, propylene glycol, butylene glycol, hexane diol, glycerine, hexane triol, trimethylolpropane, diethylene glycol, pentaerythitol, or sorbitol.

In formulating the reaction mixtures for the foams described in this invention it is preferred to use a polyoxyalkylene polyol having a molecular weight in the range of 700 to 2000 and an equivalent weight in the range of 150 to 1000, and more preferably the molecular weight of the polyol is in the range of 1000 to 1500, when using polymeric isocyanates. As stated above, it is highly preferred to use a polyoxyalkylene polyol in which at least 95% of the oxyalkylene groups are oxypropylene groups.

When mixtures of two or more polyols are used (e.g. two or more diols, diols plus triols, two or more triols) in formulating reaction mixtures it is preferred that the number average molecular weight of the polyol mixture be in the range of 700 to 2000 and the equivalent weight be in the range of 150 to 1000, and more preferably the number average molecular weight is 1000-1500.

It has been found that in order to obtain the tough semi-rigid polymeric reaction products of this invention which have the proper cross-link density, the NCO/OH equivalent ratio of the reaction mixture must be in the range of about 1.3/1 to 5/1, when using polyols having a number average molecular weight in the range of 700 to 2000. More preferably the NCO/OH ratio is in the range of 1.5/1 to 3/1. In calculating the NCO/OH ratio, the water present in the reaction mixture as well as the polyol is considered.

It is highly preferred that the cross-link density of the foamed polymeric reaction products be in the range of about 1 cross-link per 400 to 750 atomic weight units in order to obtain the tough, non-friable, heat-stable semi-rigid foams in accordance with this invention. It is even more preferred to have the cross-link density in the range of about 1 cross-link per 450 to 600 atomic weight units. In calculating the cross-link density for a given foam certain assumptions, of course, are made in accordance with conventional practices in the polyurethane and polyisocyanurate fields. These assumptions are: (1) essentially all of the water present in the reaction mixture reacts in the amount of one mole of water with two moles of isocyanate, (2) essentially all of the hydroxyl groups from the polyol react with isocyanate moieties in the making of the foamed product, and (3) essentially all of the remaining isocyanate groups react to form the isocyanurate linkages.

Cross-link density is defined as the total weight of the reactive components in the reaction mixture (in grams) divided by the total number of cross-link sites in the mixture. The number of cross-link sites is determined by the number of functional groups per gram-mole of each reactive species in the mixture in excess of two; e.g., diols and water provide no cross-linking sites; triols, triisocynates and isocyanurate rings each provide 1 cross-linking site per gram-mole of material. Catalysts, foam stabilizers, fillers, and unreactive blowing agents are ignored in these calculations.

The class of fluorochemical foam stabilisers which are particularly useful in the practice of this invention can be described in terms of the formula:

$$(R_f)_m Q_z(H)_n \qquad \text{I}$$

where $R_f$ is a fluorinated, saturated, usually monovalent, aliphatic radical, H is an active hydrogen atom, present as part of a functional group, such as hydroxyl, amino, imino, mercapto, carboxyl, and phosphate, Q is a linkage or bridge free of active hydrogen atoms and having a valence equal to m+n, m being an integer which is at least 1 and can be as high as 6 or higher, n being an integer of at least 2 and can be as high as 5 or higher (e.g. as high as 100), and z is an integer of 1-3.

The term "active hydrogen atom" as used in this application means a hydrogen atom (other than an amido hydrogen atom) which is reactive with a Grignard reagent as described in J. Am. Chem. Soc., 49, 3181, 1927. Amido hydrogen atoms, such as those present in —SO$_2$NH— and —CONH—, are difficult to react with the isocyanate moiety under conditions of casting and bonding and therefore are not considered as "active hydrogen atoms" for purposes of this invention.

The class of silicone foam stabilizers which also are useful for making the foams of this invention may be described as polysiloxane alkylene oxide copolymers. These silicone foam stabilizers and the method of preparing polyisocyanurate foams utilizing such stabilizers are described in more detail in copending application SN 380,577 filed July 19, 1973, now abandoned which is a continuation of Ser. No. 178,015 filed Sept. 7, 1971, now abandoned filed of even date, incorporated herein by reference.

The preferred class of fluorine-containing compounds used as foam stabilizers in this invention can be described as fluoroaliphatic radical-substituted poly(oxyalkylene) polyols. These compounds can be expressed in terms of the formula:

$$(R_f)_m Q_z[(RO)_x H_y]_n \qquad \text{II}$$

where $R_f$ is a fluorinated, saturated, usually monovalent, aliphatic radical, R is a polyvalent, and usually divalent, saturated aliphatic hydrocarbyl radical having 2 to 10 carbon atoms (preferably 2 to 3 carbon atoms), such as derived from ethylene or 1,2-propylene oxides, H is an active hydrogen atom, Q is a linkage or bridge free of active hydrogen atoms and having a valence equal to m+n, m being an integer which is at least 1 and can be as high as 6 or higher, n being an integer of at least 1, and usually is 2, or can be as high as 5 or higher, z is an integer of 1-3, x is an integer of at least 25 and can be as high as 400 or higher, and y is an integer of 1-5, preferably 1 to 3, the product (n) (y) being at least 2.

The fluoroaliphatic radicals, $R_f$, of the foam stabilizers are stable, inert, non-polar moieties which are both oleophobic and hydrophobic. They can be straight chain, branched chain, and, if sufficiently large, cyclic, or combinations thereof, such as alkylcycloaliphatic radicals. The skeletal chain can include catenary oxygen and/or trivalent nitrogen hetero atoms bonded only to carbon atoms, such hetero atoms providing stable linkages between flurocarbon groups and not interfering with the inert character of the $R_f$ radical. While $R_f$ can have a large number of carbon atoms, compounds

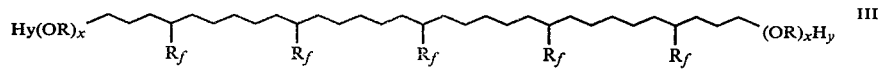

where $R_f$ is not more than 20 carbon atoms will be adequate and preferred since large radicals usually represent a less efficient utilization of flourine than is possible with smaller $R_f$ radicals. Generally, $R_f$ will have 4 to 20 carbon atoms, preferably 6 to about 12, and will contain 40–78 weight percent, preferably 50–78 weight percent, of flourine. The terminal portion of the $R_f$ group has preferably at least three fully fluorinated carbon atoms, e.g. $CF_3CF_2CF_2—$, and the preferred foam stabilizers are those in which the $R_f$ group is fully or substantially completely fluorinated, as in the case where $R_f$ is perfluoroalkyl, $C_nF_{2n+1}$.

Generally, the foam stabilizer will contain about 4 to 25 weight percent, preferably about 6 to 18 weight percent, of carbon-bonded fluorine. If the fluorine content is less than about 4 weight percent, impractically large amounts of the foam stabilizer will generally be required, while fluorine contents greater than about 25 weight percent are unnecessary to achieve foam stabilization and thus represent an uneconomical use of fluorine.

The function of the linkage or bridge Q is to bond the fluoroaliphatic radicals, $R_f$, to the polyether moieties, $(RO)_xH_y$, of the compound. Q can be a valence bond, in which case a carbon atom of a fluoroaliphatic radical is bonded or linked directly to a polyether moiety. Q can also comprise one or more linking groups such as polyvalent aliphatic, e.g. $—CH_2CH_2—$ and $—CH_2CH(CH_2—)_2$, polyvalent aromatic, e.g.

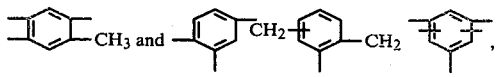

oxy, thio carbonyl, sulfone, sulfoxy, imino, e.g. $—NH—$ and $—N(C_2H_5)—$, and combinations thereof, such as oxyalkylene, iminoalkylene, iminoarylene, sulfonamido, carbonamido, sulfonamidoalkylene, carbonamidoalkylene, urethane, e.g., $—CH_2CH_2OCONH—$ and

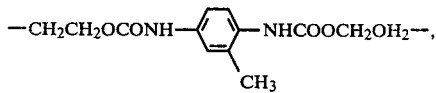

and urea, e.g., $—NHCONH—$. The linkage Q for a specific compound useful as a foam stabilizer will be dictated by the ease of preparation of such a compound and the availability of necessary precursors thereof.

From the above description of Q, it is apparent that this linkage can have a wide variety of structures, and in fact where it is a valence bond, it doesn't even exist as a structure. However large Q is, the fluorine content (the locus of which is $R_f$) of the compound is in the aforementioned limits set forth in the above description. While only one $R_f$ radical is sufficient to produce foamed products with desirable properties, i.e., where m in formula I is 1, the foam stabilizers can have a plurality of $R_f$ radicals, e.g., m can be 2 to 6, or higher. This plurality of $R_f$ radicals can be spaced along a chain terminating in active hydrogen-bearing polyether moieties, as depicted by the structure:

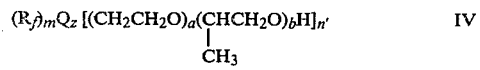

where the wavy line represents the linkage Q. Such compounds can be prepared, for example, by reacting two or more fluoroaliphatic radical-containing compounds, each having a plurality of active hydrogen atoms, with less than a stoichiometric amount of a polyisocyanate and then linking the resulting intermediate product to a polyether polyol, as will be described in detail hereinafter. Such resulting polyether polyols containing a plurality of $R_f$ groups have been found to provide effective foam stabilization at lower concentrations than the simple foam stabilizers having only one $R_f$ group.

Preferred foam stabilizers of formula II which can be used in this invention to make foamed polyisocyanurates are fluoroaliphatic radical-substituted poly(oxyalkylene) polyols of the formula:

$$(R_f)_mQ_z[(CH_2CH_2O)_a(CHCH_2O)_bH]_{n'} \quad \text{IV}$$
$$\quad \quad \quad \quad \quad \quad \quad \quad \quad \quad | $$
$$\quad \quad \quad \quad \quad \quad \quad \quad \quad \quad CH_3$$

where $R_f$, Q, m, and z are as defined for formula II above, n' is an integer of at least 2 and can be as high as 6 or higher, and a and b designate respectively the number of oxyethylene and oxypropylene units shown in parentheses, and a+b is an integer of at least 5 and can be as high as 400 or higher. The weight ratio of oxyethylene units to oxypropylene units is preferably 20:80 to 80:20. The fluorine content of these compounds is in the aforementioned limits set forth for formula I and the average molecular weights of these compounds is at least 4500 to 100,000–200,000, or higher.

The fluoroaliphatic radical-substituted poly(oxyalkylene) polyols of formula IV can be obtained by several methods, such as by the oxyalkylation or condensation of ethylene oxide and 1,2-propylene oxide with fluorine-containing compounds having at least one Zerewitinoff active hydrogen atom, e.g., $R_fSO_2N(R')CH_2CH(OH)CH_2OH$, where R' is lower alkyl or hydrogen. Said oxalkylation can be accomplished by known procedures, e.g., as described in U.S. Pat. No. 2,915,554 (Ahlbrecht and Morin), to produce active hydrogen-terminated copolymer poly(oxyalkylene) chains in which the oxyethylene and oxypropylene units are repeated in a random or block fashion within the chain.

As especially preferred subclass of the fluoroaliphatic radical-substituted polyols of formula IV is that where the poly(oxyalkylene) chain is composed of blocks of oxyethylene and blocks of oxyethylene, particularly where they form compounds of the formula:

$$(R_f)_mQ_z[(CH_2CH_2O)_d(CHCH_2O)_b(CH_2CH_2O)_aH]_{n'} \quad V$$
$$\quad \quad \quad \quad \quad \quad \quad \quad \quad \quad \quad \quad \quad | $$
$$\quad \quad \quad \quad \quad \quad \quad \quad \quad \quad \quad \quad \quad CH_3$$

where $R_f$, Q, m, and z are as defined above for formula I, a,b, and n' are as defined for formula IV, the poly(oxyethylene) to poly(oxypropylene) weight ratio in the poly(oxyalkylene) chains being in the range of 20:80 to 80:20, preferably 40:60 to 60:40. The fluorine content and molecular weight of the compounds are the same as that of formula IV.

A convenient method of preparing the fluoroaliphatic radical-substituted poly(oxyalkylene) polyols of Formula V is the reaction of precursor fluorine-containing compounds, having one or more active hydrogen atoms, with an excess of an aliphatic or aromatic polyisocyanate, to form isocyanato-terminated adducts or intermediates which are then reacted with poly(oxyalkylene) polyols, such as glycols (the preferred polyols), triols, and etrols. Reactions between functional groups containing active hydrogen atoms and the isocyanate moiety are well-known (see Sec. III of "Polyurethanes:Chemistry and Technology", Part I, by Saunders and Frisch, Interscience Publishers, 1962). In order to ultimately produce a foam stabilizer with at least two active hydrogen atoms, the isocyanate intermediate must have at least two —NCO groups, and in order to produce such intermediates, the total moles of isocyanate groups in the polyisocyanate reactant must be at least 2 more than the total moles of active hydrogen atoms in the fluoroaliphatic reactant, and the total moles of active hydrogen atoms in the poly(oxyalkylene) polyol reactant must be at least 2 more than the total moles of isocyanate groups in the isocyanate intermediate. By choosing the right poly(oxyalkylene) polyol reactant, i.e., one with the desired molecular weight, the desired fluorine content can be obtained. Typically, the desired fluorine content can be obtained. Typically, the molecular weight of this polyol reactant will be five to ten times are large as that of the fluoroaliphatic precursor.

Representative subclasses of fluoroaliphatic radical-substituted precursors which can be used to form the foam stabilizers include:

$R_fSO_2NHRCH_2OH$,
where R is alkylene with 1-12 carbon atoms;
$R_fSO_2NHRSH$, and
$R_fCONHRSH$,
where R is alkylene with 3-14 carbon atoms;
$R_fSO_2NR'(RNH)_xRNH_2$,
$R_fCONR'(RNH)_xRNH_2$,
$R_fSO_2NR'RCONH(RNH)_xRNH_2$,
$R_fSO_2NR'RCONH(RO)_xRNH_2$, and
$R_f(RNH)_xRNH_2$,
where R' is hydrogen or alkyl with 1-6 carbon atoms, R is alkylene of 2-12 carbon atoms, and x is 1 or greater;
$R_fSO_2NR'Z(OH)_n$
where R' is hydrogen or alkyl with 1-12 carbon atoms, Z is aliphatic, aromatic, alicyclic, or arylaliphatic, and n is at least 2;
$R_fSO_2NH(CH_2)_nNHZ(NH_2)_2$,
$R_fSO_2NR'Z(NH_2)$,
$R_fCONH(CH_2)_mNHZ(NH_2)_2$,
$R_fCONH(CH_2)_mNHZ(NH_2)_2$,
$R_f(CH_2)_qOZ(NH_2)_2$,
$R_f(CH_2)_qNHZ(NH_2)_2$, and
their hydrazino analogs, where R' is hydrogen or lower alkyl, Z is a 2,4-substituted triazine ring, n is 1-12, m is 0-12, and q is 1-13;
$R_fSO_2NH(CH_2)_nCOOH$,
where m is 1-12;
$R'_fOCH_2CH(R)OH$, and
$R'_fO[CH_2CH(R)O]_nCH_2CH(R)OH$, where R is hydrogen or methyl and n is an integer of 1 or more, and $R'_f$ is a tertiary fluoroaliphatic radical;

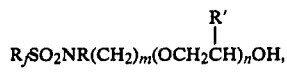

where R is hydrogen or

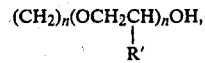

R' is hydrogen or methyl, m is 2-3, and n is 2-20;
$R_fQNRR'NH_2$
where Q is sulfonyl or carbonyl, R is alkyl with 1-6 carbons, and R' is alkylene with 2-13 carbon atoms;
$R_fRCOOH$,
$R_fRCH_2OH$,
$R_fQNHRCH_2OH$, and
$R_fQNHROOH$,
where Q is sulfonyl or carbonyl, and R is alkylene with 1-18 carbon atoms; and
$(R_f)_m$ $(COOH)_n$
where m and n are integers of 1 or 2.

There are a host of prior art fluorine-containing compounds which have only a single active hydrogen atom. These can be reacted with epoxy alkanols, such as 2,3-epoxy-1-propanol, to form fluorine containing compounds with two active hydrogen atoms (as part of hydroxyl groups) which can be used in this invention to form foam stabilizers which fall within the scope of formula II.

Specific precursor fluoroaliphatic radical-substituted compounds which can be used to prepare the foam stabilizers representatively include:
$CF_3(CF_2)_7SO_2N(CH_3)CH_2CH_2OH$
$CF_3(CF_2)_3SO_2N(CH_3)CH(CH_3)CH_2OH$
$CF_3(CF_2)_7SO_2N(CH_2CH_3)CH_2CH_2OH$
$CF_3(CF_2)_3SO_2N(CH_3)CH_2CH(CH_3)OH$
$CF_3(CF_2)_7SO_2N(CH_2CH_3)CH_2CH_2OH$
$CF_3(CF_2)_9SO_2N(CH_2CH_2CH_3)CH_2CH_2OH$
$CF_3(CF_2)_7SO_2N(CH_2CH_2CH_3)CH_2CH_2OH$
$CF_3(CF_2)_7SO_2N(CH_3)(CH_2)_5SH$
$CF_3(CF_2)_7SO_2N(C_2H_5)CH_2COOH$
$CF_3(CF_2)_7SO_2N(C_2N(C_2H_5)(CH_2)_6OH$
$CF_3(CF_2)_7SO_2N(C_2H_5)(CH_2)_{11}OH$
$CF_3(CF_2)_7SO_2N(C_4H_9)(CH_2)_4OH$
$CF_3(CF_2)_7SO_2N(CH_3)(CH_2)_4OH$
$CF_3(CF_2)_7SO_2N(CH_2CH_3)CH_2CH_2NH_2$
$[CF_3(CF_2)_7SO_2N(CH_2CH_3)CH_2CH_2]_2NH$
$CF_3(CF_2)_7SO_2N(CH_2CH_3)CH_2CH_2N(CH_3)H$
$CF_3(CF_2)_7SO_2N(CH_3)CH_2CH_2SH$
$CF_3C_6F_{10}C_2F_4SO_2N(CH_3)CH_2CH_2OH$
$C_2F_5O(C_2F_4O)_3CF_2CONHC_2H_4OH$
$CF_3(CF_2)_7SO_2N(C_3H_7)CH_2OCH_2CH_2CH_2OH$

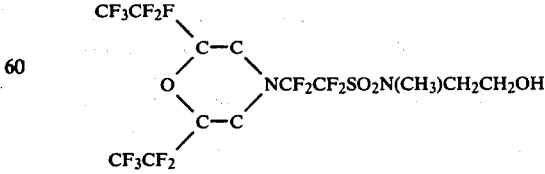

$CF_3CF(CF_2Cl)(CF_2CF_2)_6CF_2CON(CH_3)CH_2CH_2OH$
$CF_3CF(CF_2H)(CF_2CF_2)_6CF_2CONHCH_2CH(OH)CH_2OH$ $CF_3(CF_2)_7SO_2CH_2CH_2OH$
$CF_3(CF_2)_7SO_2N(CH_3)CH_2CH_2SH$
$C_7F_{15}CON(C_2H_5)C_2H_4OH$
$CF_3(CF_2)_7CH_2CH_2CH_2OH$ $$CF_3CF_2)_7CH_2\underset{\underset{CH_2OH}{|}}{CH}(CH_2CHO)_6H$$

A wide variety of poly(oxyalkylene) compounds having at least one functional group containing active hydrogen can be used to prepare the foam stabilizers of Formula II. Poly(oxyalkylene) polyols with a wide range of molecular weights which are commercially available and can be used for this purpose include, for example, those set forth in Appendix B of Saunders & Frisch, supra. The foam stabilizers of formula V are conveniently made using the poly(oxyalkylene) polyols which are sold under the trademark "Pluronic," those having molecular weights of 1500 to 3000 being particularly suitable.

Another useful class of fluorochemical foam stabilizers which can be used in this invention, and which come within formula I, supra, are the perfluoroalkyl amines described in U.S. Pat. No. 3,378,399 (Rambosek), the disclosure of which is incorporated herein by reference. These compounds have the formula:

$$R_fWNH_2 \qquad \qquad VI$$

wherein $R_f$ is perfluoroalkyl of 4 to 12 carbon atoms, and W is a linking group such as the following.

$$-SO_2N\overset{\overset{R_1}{|}}{-}(RNH)_xR-$$
$$-CON\overset{\overset{R_1}{|}}{-}(RNH)_xR-$$
$$-SO_2NRCONH\overset{\overset{R_1}{|}}{-}(RNH)_xR-$$
$$-SO_2NRNH\overset{\overset{R_1}{|}}{-}(RO)_yR-$$
$$-(RNH)_xR-$$

where $R_1$ is hydrogen or alkyl of 1 to 6 carbon atoms, R is alkylene of 2 to 12 carbon atoms, x is zero or an integer of 1 to 8 or higher, e.g., up to 100 or more, and y is an integer of 1 to 8 or higher.

Representative foam stabilizers of this type which can be used in this invention include:
$C_4F_9SO_2NHC_2H_4NHC_2H_4NH_2$
$C_7F_{15}CONHC_2H_4NHC_2H_4NH_2$
$CF_3CF(CF_2H)(CF_2)_{13}CONHCH_2CH(OH)CH_2OH$
$C_8F_{17}SO_2N(C_2H_5)CH_2OP(O)(OH)_2$ Other useful foam stabilizers within the scope of formula I, supra, of this invention are disclosed in U.S. Pat. Nos. 3,378,399 (Rambosek), 3,128,272 (Wear et al.) 3,217,035 (LaZerte et al.), 3,478,116 (Smeltz), 3,450,755 (Ahlbrecht), 3,458,571 (Tokoli).

The particular foam stabilizer and amount thereof chosen for making a foamed product in accordance with this invention will depend upon its solubility in the particular reaction mixture being foamed and will also depend upon the catalyst used. Foam stabilizers having a high fluorine content and/or a high molecular weight can be used in lower amounts. Amounts as high as 20 weight percent, based on the weight of the total reaction mixture, can be used but generally it will be uneconomical and unnecessary to use such high amounts. Amounts less than about 0.1 weight percent will be generally ineffective. Usually 0.5 to 5 weight percent of foam stabilizer will provide satisfactory foams with a high percent of uniform cells. Functionally stated, the amount of foam stabilizer to use will be a foam stabilizing amount.

In preparing foamed polyisocyanurate products according to this invention, polyisocyanate and polyol can be reacted in conventional manner, for example, by the so-called one-shot, prepolymer or semi-prepolymer techniques (see "Handbook of Foamed Plastics", by Bender, Lake Publishing Corp. (1965), said reaction being carried out in the presence of trimerization catalyst, blowing agent, and other known adjuvants (e.g., flame retardants such as polyvinyl chloride-antimony oxide compounds), together with one or more foam stabilizers of the type described. In order to obtain the proper cross-link density and heat stability, however, the NCO/OH equivalent ratio of the reaction mixture should be in the range of about 1.3/1 to 5/1. The resulting foamed or cellular product has a cell structure comprising uniform, fine open and closed cells or voids and preferably exhibits desirable physical properties, such as heat stability and toughness. These foamed products also form very firm bonds to oil and grease contaminated substrates when foamed in situ.

Generally, the polyisocyanate reactant, polyol, catalyst, blowing agent (usually water) and foam stabilizer will be mixed together batchwise in a stirred container or continuously in a mixing chamber. The foamable mixture can then be transferred to a suitable mold or cavity to be filled. The foamable mix can also be applied to large surfaces by spraying. If desired, one or more of the ingredients can be preheated or precooled before mixing takes place. Process conditions, such as temperature, pressure, reaction time, and order of addition will be conventional and are not critical. The foam stabilizer can be premixed with the polyisocyanate component or polyol component, depending on its solubility in these components. For some reaction mixtures or foam stabilizers, it may be desirable to add the foam stabilizer to the reaction mixture or reactant component thereof in a solvated form (e.g., as a solution in a solvent such as methyl ethyl ketone or an alkaline methanol) or to heat the reaction mixture or foam stabilizer, in order to get a better dispersion of the foam stabilizer in the reaction mixture, and thereby produce a foamed product with a higher percentage of uniform small cells.

When using fluorochemical stabilizers of formula II, supra, in making foamed products in accordance with this invention it has been found that the type of isocyanate trimerization catalyst used therewith can vary. For example, the catalyst may be weakly basic (e.g., alkali metal salts of carboxylic acids, such as sodium acetate, potassium acetate, potassium 2-ethylhexoate, sodium benzoate, and the like). Strongly basic catalysts can also be used, e.g., alkali metal hydroxides (such as sodium or potassium hydroxide), alkali metal alkoxides (such as sodium methoxide), and quaternary ammonium hydroxides (such as benzyl trimethylammonium hydroxide). Other suitable catalysts include neutral metal salts of carboxylic acids, e.g., lead octoate, stannous octoate, phenyl mercuric oleate and phenyl mercuric acetate. One may also use, in conjunction with the above-mentioned catalysts, materials such as aliphatic tertiary amines (e.g., 1,4-diazabicyclo [2.2.2]octane), certain organic metal compounds (e.g., dibutyltin dilaurate) and epoxides (e.g., propylene oxide and phenyl glycidyl ether).

The amount of trimerization catalyst used in making suitable foams can vary. Generally, an amount of catalyst in the range of 0.1–10 parts per 100 parts of polyisocyanate is suitable, although the amount of catalyst will most usually be in the range of 1–8 parts per 100 parts of polyisocyanate.

When the fluorochemical stabilizers of formula VI, supra, are used in making foamed reaction products in accordance with this invention, it is highly preferred to employ a catalyst which is strongly basic in nature so that the resulting foamed reaction product will have a highly uniform cell structure. Suitable strongly basic catalysts include alkali metal hydroxides, alkali metal alkoxides, and quaternary ammonium hydroxides. Specific examples of such catalysts are potassium hydroxide and sodium dipropylene glycolate. The amount of used will generally be in the range of 0.1–10 parts per 100 parts of polyisocyanate, and preferably the amount used is in the range of 0.5–5 parts per 100 parts of polyisocyanate.

Preferably the blowing agent used in this invention is water, although halocarbon blowing agents, such as Freon 11 or Freon 12, can be used by themselves or in combination with water. The amount of water used as blowing agent preferably is in the range of 0.5–4% based on the weight of polyisocyanate, in order to obtain foamed polymeric reaction products having a free rise density in the range of 1.5 to 6 lbs. per cubic foot. More preferably the amount of water used is in the range of 1 to 2% in order to obtain foamed polymeric reaction products having a free rise density in the range of 2 to 4 lbs. per cubic foot.

Where a foam is used in a structural panel, the physical properties of the foam which are most important are: ability to form firm, permanent bonds to the panels; compression strength; tensile strength; and shear strength. Because some of these properties are interrelated it is very difficult to set absolute limits for each such property which must be exhibited by the foam. However, a test method has been found which conveniently correlates the above-mentioned properties of the foam in a single test and accurately distinguishes foams suitable for use in structural panels (of the energy absorption type) from those foams which are not suitable therefor. This test is referred to herein as a "beam flexure test".

Generally, this test involves (1) placing oil-coated steel panels into a suitable mold or cavity in such manner that a space is defined between the oil-coated panels, (2) casting or pouring into the defined space between the oil-coated panels a reaction mixture of the ingredients used to make the particular polyisocyanurate foam to be tested (3) allowing the foam to form in situ, (4) removing the so-formed sandwich panel construction; the sandwich panel may be aged under various conditions at this point, (5) placing the sandwich panel in horizontal position on an Instron tensile machine, the sandwich panel being supported near each of its ends with suitable support means, (6) applying increasing force to the center of the top surface of the sandwich panel with the Instron machine, (7) measuring the maximum force needed to buckle or break the sandwich panel, (8) measuring the maximum amount of deflection of the sandwich panel from the horizontal beyond which such panel buckles or breaks, and (9) recording the "beam flexure characteristic" for the particular foam, the beam flexure characteristic being expressed in terms of (a) the pounds of force necessary to buckle or break the panel, and (b) the maximum deflection noted before buckling or breaking of the panel. Typical beam flexure characteristics for the polyisocyanurate foams described in this invention are 130 lbs. with 2 inches deflection under the test conditions described below.

It has been found that polyisocyanurate foams suitable for use in structural panels where high impact-resistance (i.e. energy absorption) and strength are necessary must exhibit a beam flexure characteristic of at least 100 lbs. with at least 1 inch deflection under that test condition. Foams which do not adhere firmly to the oil-coated steel panels will exhibit adhesive failure at the interface between the foam and the steel panel during the test and such foams are therefore not suitable for use in accordance with this invention. For the purposes of this test, the foam is regarded as having inadequate adhesion to the panel, if, after completion of the test, the foam remaining bonded to the steel panel covers less than 50% of the area of the inner surface of the upper steel panel. Foams which are too brittle or friable do not exhibit deflections of at least one inch before buckling.

The beam flexure test will now be described in more detail with reference to the accompanying drawings wherein like reference characters refer to the same parts throughout the several views and in which:

FIG. 1 is a perspective view of a mold suitable for making sandwich panel constructions to be tested;

FIG. 2 shows an assembled structure of steel panels yet to be bonded together with foam;

FIG. 3 shows a sandwich panel or laminate in position for testing; and

FIG. 4 shows the sandwich panel of FIG. 3 during the performance of the test.

In FIG. 1 there is shown a wooden block 10 having a rectangular cavity 12 therein. The dimensions of cavity 12 are 20¼ inches × 4½ inches × 1⅛ inches.

Before making the sandwich panel construction, a thin (10 mil) polyethylene film (not shown) is first positioned within cavity 12 along the walls thereof. Two cold rolled steel panels (20 inches × 4 inches × 0.035 inch; ASTM A366) are then prepared for later positioning within cavity 12 according to the following procedure.

The steel panels are each cleaned thoroughly with methyl ethyl ketone or other suitable solvent followed by coating one major surface of each panel with a liberal amount of a mineral oil (Texaco Almag 1654, a paraffin oil with pour point of +5° F. viscosity of 47 Saybolt Universal Seconds and A.P.I. gravity of 32.) The steel panels are then placed in vertical position to allow excess oil to drain off (approximately 16 hours). The oil remaining on each steel panel is approximately 0.1 gram.

The oil-contaminated steel panels are then positioned in parallel relationship as shown in FIG. 2, with the oil-contaminated surfaces 16 of the panels 14 facing each other. Two small cold rolled steel end pieces 18 (4 inches × 0.93 inch × 0.035 inch) are positioned between panels 14 in the manner shown in order to maintain a fixed distance therebetween, small strips of pressure-sensitive adhesive tape 20 being used to hold end pieces 18 and panels 14 together as shown. Assembled structure 22, having outside dimensions of 20 inches ×

4 inches × 1 inch, and a cavity 24 therein, is then weighed.

After assembled structue 22 has been weighed, it is positioned within cavity 12 of block 10. The precursor reaction mixture of the desired foam to be tested is then poured into the cavity 24 of assembled structure 22. The reaction mixture is allowed to react to form a foamed polymeric reaction product in situ, the foamed product forming a bond to surfaces 16 of panels 14. After the foam has stopped rising, another 10 or 20 minutes are allowed to elapse before removing the finished sandwich panel construction from cavity 12. After allowing the sandwich panel construction to age overnight at room temperature the excess foam is trimmed off the panel edges to leave a panel of 20 inches × 4 inches × 1 inch. This sandwich panel is then weighed and the foam density is calculated.

In FIG. 3 there is shown a sandwich panel 26 prepared according to the foregoing procedure in position for testing of the beam flexure characteristic of the foamed polymer. Sandwich panel 26 comprises steel panels 14 being bonded together with foamed polymer 28. Sandwich panel 26 is shown horizontally supported by supports 30 on an Instron machine. Supports 30 are each positioned 1.5 inches from the ends of panel 26, supports 30 thereby being 17 inches apart. Midway along the top surface of panel 26 increasing downward force is applied thereto with wooden member 32 which is semi-circular in cross-section and has a 6-inch radius.

In FIG. 4 there is shown panel 26 during the performance of the test, panel 26 being deflected as the downward force increases at the rate of 1 inch per minute. The maximum force required to break or buckle panel 26 is recorded, e.g. such force might be 130 lbs. or 140 lbs. The maximum amount of deflection of panel 26 from the horizontal before breaking or buckling is also recorded, e.g. such deflection might be 1 inch or 2 inches. The amount of deflection can be very conveniently measured with the Instron machine by setting the chart speed at the same rate of travel as that of member 32. The beam flexure characteristic of the foam is then recorded in terms of a certain number of pounds of force with a certain number of inches deflection, e.g. 130 lbs. with 2 inches deflection.

Objects and advantages of this invention are further illustrated by the following non-limiting examples, wherein the parts recited are parts by weight unless otherwise indicated.

EXAMPLE 1

A useful fluorochemical foam stabilizer of the type described in formula I, supra, is prepared as follows:

To a 3000 liter glasslined kettle equipped with an agitator, heating and cooling coils, vacuum attachment, reflux condenser, nitrogen purge and bottom drain, was added:

|  | Parts |
| --- | --- |
| block copolymer diol (40% polythylene oxide, 60% polypropylene oxide; molecular weight 2000) | 300 |
| toluene | 300 |
| phenothiazine | 0.075 |
| acrylic acid | 147 |
| p-toluene sulfonic acid | 6 |

The kettle charge was heated to reflux temperature (about 115° C.), agitated, and water azeotroped until the acidity of a sample thereof became constant (determined by titration with dilute sodium hydroxide) which took about eight hours. The kettle was then cooled to about 50° C. and 6.9 parts of powdered calcium hydroxide and 3 parts of decolorising carbon added. Agitation was continued for one hour and the contents drained and filtered to produce a polyether acrylate solution.

The product polyether acrylate solution prepared above was charged to the above-described kettle and 135 parts of $C_8F_{17}SO_2N(C_4H_9)C_2H_4O_2CCH=CH_2$ added. Sufficient toluene (about 150 parts) was added to make a 50% solution. Twenty-two and one-half parts of octyl mercaptan were added and the solution heated to 50° C. The kettle was purged with dry oxygen-free nitrogen by evacuating the kettle until the solvent began to boil, then adding nitrogen to atmospheric pressure and repeating twice more. A slow stream of nitrogen was continued throughout the remainder of the preparation.

Three and four-tenths parts of $t-C_4H_9OOH$ was added to the kettle and the solution heated, with agitation, to 65° C. and held for twelve hours until polymerization was substantially complete. Toluene solvent was vacuum stripped at about 30 mm. Hg and a final temperature of about 120° C. The product copolyacrylate was cooled to about 65° C. and drained through a silk screen into suitable containers.

EXAMPLE 2

Another useful fluorochemical foam stabilizer of the type described in formula I, supra, is prepared as follows:

A 100 liter glasslined kettle equipped as described in Example 1 was charged with:

|  | Parts |
| --- | --- |
| $C_8F_{17}SO_2N(C_2H_4OH)_2$ | 11.5 |
| $CH_3COC_2H_5$ | 19.2 |

The kettle charge was azeotroped through a decanter to remove adventitious water. A purge of oxygen-free nitrogen was maintained throughout the reaction. The kettle was cooled to 50° C. and 6.7 parts of tolylene diisocyanate and 0.02 parts triethylamine catalyst added. Heating and agitation at 60° C. were continued for four hours. 53.8 parts of a polyether block copolymer diol (40% polyethylene oxide, 60 polypropylene oxide; molecular weight 2000 - Pluronic L-44) was added and heating and agitation at 70° C. were continued for about eight hours until further tests for isocyanate were negative. Solvent was stripped at 70° C. under about 100 mm Hg pressure to about 80% solids. The kettle temperature was lowered to 50° C., pressure returned to atmospheric, and the contents drained through silk screen into suitable containers.

The following describes suitable two-part compositions which were used to prepare low density isocyanurate foams.

EXAMPLE 3

Part A of the composition was prepared by mixing together at room temperature the following ingredients to obtain a homogenous dispersion:

|  | Parts |
| --- | --- |
| polyoxypropylene diol (molecuar weight 2000) | 60 |

| | Parts |
|---|---|
| polyoxypropylene diol (molecular weight 400) | 40 |
| sodium dipropylene glycolate catalyst | 12 |
| fluorochemical stabilizer from Example 2 | 2.5 |
| water | 2.5 |

Part B of the composition was 150 parts of Mondur MRS, a tradename for a polymethylene polyphenyl polyisocyanate (equivalent weight 135).

The sodium dipropylene glycolate catalyst was prepared by mixing 5.12 parts of a 50% sodium hydroxide solution with 30.7 parts of dipropylene glycol, followed by heating of the mixture at 125° C. for 6 hours under a vacuum of 25 mm. of mercury.

At room temperature, Part B of the composition was added to and mixed with Part A (the NCO/OH ratio of the resulting mixture being 2.1/1) until the mixture reached cream time (approximately 5 seconds), after which the mixture was poured into an open container and allowed to free rise. The time period elapsing after the mixture was poured into the open container until the mixture reached a tack-free state (hereinafter referred to as "set time") was approximately 20 seconds.

The resulting poly(urethane-isocyanurate) foam was semi-rigid, having uniform, fine, closed cells (3%) and open cells (97%) and a free rise core density of 3.8 lbs./ft.$^3$ The cross-link density was 1 cross-link per 580 atomic weight units. This foam exhibited the properties described in Table I.

TABLE I

| Weight Loss | |
|---|---|
| 4 hours at 300° F. | 3% |
| 4 hours at 350° F. | 9.5% |
| Volume Change | |
| 4 hours at 350° F. | 9% |
| Tensile strength | 25 psi |
| Compression strength | |
| No Aging | 18 psi |
| 240 hours at 300° F. | 26 psi |

Beam Flexure Characteristic: No aging, (foam density of 4.25 lbs./ft.$^3$), 135 lbs. with 1.25 inches deflection.

The foam density of the foam in the sandwich panel used for the beam flexure test is characteristically slightly greater than the free rise core density of the same foam because of the slightly denser foam formed along the steel panel foam interface during the making of the panel.

EXAMPLE 4

Part A of the composition was prepared by mixing together the following ingredients, at room temperature, to obtain a homogenous dispersion:

| | Parts |
|---|---|
| polyoxypropylene diol (molecular weight 2000) | 60 |
| polyoxypropylene triol (TP-440; molecular weight 425) | 40 |
| sodium dipropylene glycolate (from Example 3) | 10 |
| fluorochemical stabilizer from Example 2 | 2.5 |
| water | 3.0 |

Part B of the composition was 150 parts of Mondur MRS.

At room temperature, Part B was added to and mixed with Part A (the NCO/OH ratio being 1.6/1) until cream time (approximately 8 seconds) after which the mixture was poured into an open container and allowed to free rise. The set time for this mixture was approximately 30 seconds.

The resulting poly(urethane-isocyanurate) foam was semi-rigid, having uniform, fine, closed cells (3%) and open cells (97%) and a free rise core density of 2.7 lbs./ft.$^3$ The cross-link density was 1 cross-link per 510 atomic weight units. This foam exhibited the properties described in Table II.

TABLE II.

| Weight Loss | |
|---|---|
| 4 hours at 300° F. | 1% |
| 4 hours at 350° F. | 2% |
| Volume Change | |
| 4 hours at 350° F. | 1.5% |
| Tensile Strength | 34 psi |
| Compression Strength | |
| No aging | 27 psi |
| 240 hours at 300° F. | 29.5 psi |

Beam Flexure Characteristic (foam density of 3.3 lbs./ft.$^3$)
No aging 150 lbs. with 2.5 inches deflection
Aged 1 hour at 350° F. 150 lbs. with 2.5 inches deflection Low density foam sandwich panels made using the foamable composition of Example 4 were passed through a typical cleaning and paint baking cycle (e.g. Bonderite process) and paint bake conditions of 350° F. for 1 hour. Good dimensional stability was observed.

EXAMPLE 5

Part A of the composition was prepared by mixing together, at room temperature, the following ingredients to obtain a homogeneous dispersion:

| | Parts |
|---|---|
| polyoxypropylene diol (molecular weight 2000) | 60 |
| polyoxypropylene triol (TP-440; molecular weight 425) | 40 |
| sodium dipropylene glycolate (from Example 3) | 10 |
| $C_8F_{17}SO_2N(C_2H_5)C_2H_4NHC_2H_4NHC_2H_4NH_2$ | 2.5 |
| water | 3.0 |

Part B of the composition was 150 parts of Mondur MRS.

A room temperature, Part B was added to and mixed with Part A (the NCO/OH ratio being 1.6/1) until cream time (approximately 4 seconds), after which the mixture was poured into an open container and allowed to free rise. The set time was approximately 14 seconds.

The resulting poly(urethane-isocyanurate) foam was semi-rigid, having uniform, fine, closed cells (6%) and open cells (94%) and a free rise core density of 2.9 lbs./ft.$^3$ The cross-link density was 1 cross-link per 510 atomic weight units. This foam was heat stable and exhibited beam flexure characteristics (foam density of 3.5 lbs./ft.$^3$) of 130 lbs. with 2.5 inches deflection (no aging) and 140 lbs. with 2.75 inches deflection (aging of 1 hour at 350° F.)

EXAMPLE 6

Part A of the composition was prepared by mixing together the following ingredients, at room temperature, to obtain a homogeneous dispersion:

| | Parts |
|---|---|
| polyoxypropylene diol (molecular weight 2000) | 60 |
| polyoxypropylene triol (TP-440; molecular weight 425) | 40 |
| sodium dipropylene glycolate (from Example 3) | 10 |
| fluorochemical stabilizer from Example 2 | 2.5 |

| | Parts |
|---|---|
| water | 3.0 |

Part B of the composition was 125 parts of PAPI, a polymethylene polyphenyl polyisocyanate, equivalent weight 135.

At room temperature, Part B was added to and mixed with Part A (the NCO/OH ratio being 1.4/1) until cream time (approximately 8 seconds) after which the mixture was poured into an open container and allowed to free rise. The set time for this mixture was approximately 5 seconds.

The resulting semi-rigid poly(urethane-isocyanurate) foam had uniform, fine, closed cells, (about 53%) and open cells (about 47%) a free rise density of 2.76 lbs./ft.$^3$, and a cross-link density of 1 cross-link per 585 atomic weight units. After 1 hour at 350° F. this foam exhibited less than a 5% volume change. Beam flexure characteristics for this foam are at least 100 lbs. with at least 1 inch deflection.

EXAMPLE 7

Part A of the composition was prepared by mixing together the following ingredients, at room temperature, to obtain a homogenous disperion:

| | Parts |
|---|---|
| polyoxypropylene diol (molecular weight 2000) | 60 |
| polyoxypropylene triol (TP-440; molecular weight 425) | 40 |
| potassium acetate | 2.0 |
| N,N-dimethylcyclohexylamine | 1.5 |
| diethylene glycol | 4.0 |
| fluorochemical stabilizer from Example 2 | 2.5 |
| water | 3.0 |

Part B of the composition was 182.5 parts of Mondur MRS.

At room temperature, Part B was added to and mixed with Part A (the NCO/OH ratio being 1.8/1) until cream time (approximately 13 seconds), after which the mixture was poured into an open container and allowed to free rise. The set time for this mixture was approximately 30 seconds.

The resulting semi-rigid poly(urethane-isocyanurate) from had uniform, fine, closed cells (about 61%) and open cells (about 39%) and a free rise density of 2.4 lbs./ft.$^3$ The cross-link density was 1 cross-link per 480 atomic weight units.

This foam exhibited the properties described in Table III.

TABLE III

| Weight Loss | |
|---|---|
| 4 hours at 300° F. | 1.5% |
| 4 hours at 350° F. | 2% |
| Volume Change | |
| 4 hours at 350° F. | 2% |

Beam Flexure Characteristic (foam density of 3.1 lbs./ft.$^3$)
No aging 143 lbs. with 2.75 inches deflection
1 hour at 350° F. 140 lbs. with 1.5 inches deflection

EXAMPLE 8

Part A of the composition was prepared by mixing together the following ingredients, at room temperature, to obtain a homogeneous disperion:

| | Parts |
|---|---|
| polyoxypropylene diol (molecuar weight 2000) | 60 |
| polyoxypropylene triol (TP-440; molecular weight 425) | 40 |
| potassium acetate | 2.0 |
| N,N-dimethylcyclohexylamine | 1.5 |
| diethylene glycol | 4.0 |
| fluorochemical stabilizer from Example 1 | 2.5 |
| water | 3.0 |

Part B of the composition was 182.5 parts of Mondur MRS.

At room temperature, Part B was added to and mixed with Part A (the NCO/OH ratio being 1.8/1) until cream time (appoximately 19 seconds), after which the mixture was poured into an open container and allowed to free rise. The set for this mixture was approximately 39 seconds.

The resulting poly(urethane-isocyanurate) foam was semi-rigid and had uniform, fine, closed cells (about 24%) and open cells (about 76%) and a free rise density of 2.1 lbs./ft.$^3$. The cross-link density was 1 cross-link per 480 atomic weight units.

This foam was heat stable, and the beam flexure characteristics for this foam are at least 100 lbs. with 1 inch deflection.

The foams produced in accordance with this invention are tough, non-friable, heat-stable semi-rigid low density polymeric reaction products which find particular utility in structural application where light weight and high impact absorption are needed (e.g. in automobile bodies) although these foams are also useful for thermal insulation application also. The novel foams exhibit beam flexure characteristics of at least 100 lbs. with at least 1 inch deflection both initially (no accelerated aging) and after heat aging of 1 hour at 250° F.

What is claimed is:

1. A low density, non-friable, foamed polymeric reaction product formed by the reaction of organic polyisocycanate and polyoxyalkylene polyol in the presence of isocyanate trimerization catalyst, water as the blowing agent and surfactant, the NCO/OH equivalent ratio being 1.3/1 to 3/1, wherein more than half of th oxyalkylene units of said polyol are oxypropylene units and wherein the average molecular weight of said polyol is in the range of 700 to 1,500; said polymeric reaction product having isocyanate-derived linkages selected from the group consisting essentially of isocyanurate, uethane and urea linkages; the crosslink density of said product being in the range of about one crosslink per 400 to 600 atomic weight units, and wherein said polymeric reaction product exhibits a beam flexure characteristic of at least 100 pounds with at least one inch deflection.

2. A foamed polymeric reaction product in accordance with claim 1, wherein said NCO/OH equivalent ratio is in the range of 1.5/1 to 3/1.

3. A foamed polymeric reaction product in accordance with claim 1, wherein at least 95% of the oxalkylene units of said polyol are oxypropylene units.

4. A foamed polymeric reaction product in accordance with claim 3, wherein said NCO/OH ratio is in the range of 1.5/1 and the cross-link density of said product is in the range of about 1 cross-link per 400 to 600 atomic weight units.

5. A composition which, when mixed with organic polyisocycanate, reacts to form a foamed polymeric reaction product, said composition comprising:

(a) polyoxyalkylene polyol, wherein at least half of the oxyalkylene unit of said polyol are oxypropylene units, and wherein the average molecular weight of said polyol is in the range of 700 to 1,500;
(b) isocyanate trimerization catalyst;
(c) water as the blowing agent;
(d) foam stabilizer of the formula; $(R_f)_m Q_z(H)_n$ wherein $R_f$ is a fluorinated, saturated aliphatic radical, H is an active hydrogen atom, Q is a linkage free of active hydrogen atoms and having a valence of m+n, m is an integer which is at least 1, n is an integer of at least 2, and z is an integer of 1–3;

wherein said composition, when mixed with an amount of organic polyisocyanate sufficient to form a mixture wherein the NCO/OH equivalent ratio is in the range of 1.3/1 to 3/1, reacts to form a tough, non-friable foamed polymeric reaction product having a crosslink density of about one crosslink per 400 to 600 atomic weight units.

6. A composition in accordance with claim 5, wherein at least 95% of the oxyalkylene units of said polyol are oxypropylene units.

7. A composition in accordance with claim 5, wherein said foam stabilizer is of the formula

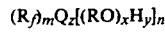

$(R_f)_m Q_z[(RO)_x H_y]_n$ wherein $R_f$ is a fluorinated, saturated aliphatic radical, R is a polyvalent, saturated aliphatic hydrocarbyl radical having 2 to 10 carbon atoms, H is an active hydrogen atom, Q is a linkage free of active hydrogen atoms and having a valence of m+n, m is an integer of 1 or more, n is an integer of 1 or more, z is an integer of 1–3, x is an integer of at least 25, y is an integer of 1–5, and the product (n)(y) is at least 2.

8. A low density, non-friable, heat-stable foamed polymeric reaction product formed by the reaction of organic polyisocyanate and polyoxyalkylene polyol in the presence of isocyanate trimerization catalyst, water as the blowing agent and surfactant, the NCO/OH equivalent ratio being about 1.3/1 to about 1.5/1, wherein more than half of the oxyalkylene units of said polyol are oxypropylene units and wherein the average molecular weight of said polyol is in the range of about 1,000 to about 1,500; said polymeric reaction product having isocyanate-derived linkages selected from the group consisting essentially of isocyanurate, urethane and urea linkages; the crosslink density of said product being in the range of about one cross-link per 400 to 600 atomic weight units, and wherein said polymeric reaction product exhibits a beam flexure characteristic of at least 100 pounds with at least one inch deflection.

* * * * *

UNITED STATES PATENT AND TRADEMARK OFFICE
CERTIFICATE OF CORRECTION

PATENT NO. : 4,247,656

DATED : January 27, 1981

INVENTOR(S) : Edward W. Janssen

It is certified that error appears in the above-identified patent and that said Letters Patent are hereby corrected as shown below:

Column 6, line 9, "stabilisers" should read -- stabilizers --;

Column 6, line 27, -- J. Amer. Chem. Soc., 49 -- should be underlined;

Column 8, line 57, "As" should read -- An --;

Column 8, line 60, second "oxyethylene" should read -- oxypropylene --;

Column 9, line 11, "isocyanato" should read -- isocyanate --;

Column 9, line 14, "etrols" should read -- tetrols --;

Column 9, line 34, "are" should read -- as --;

Column 10, line 21, "$R_fQNHROOH$" should read -- $R_fQNHRCOOH$ --;

Column 10, line 46, "$CF_3(CF_2)_7SO_2N(C_2N(C_2N(C_2H_5)(CH_2)_6OH$" should read
-- $CF_3(CF_2)_7SO_2N(C_2H_5)(CH_2)_6OH$ --;

Column 11, line 6, "$CF_3CF_2)$" should read -- $CF_3(CF_2)$ --;

Column 14, line 10, "reist-" should read -- resist- --;

Column 15, line 64, "147" should read -- 14.7 --;

Column 16, line 65, "homogenous" should read -- homogeneous --;

Column 17, line 54, "homogenous" should read -- homogeneous --;

Column 19, line 18, "2.76" should read -- 2.7 --;

Column 19, line 28, "homogenous" should read -- homogeneous --;

UNITED STATES PATENT AND TRADEMARK OFFICE
CERTIFICATE OF CORRECTION

PATENT NO. : 4,247,656

DATED : January 27, 1981

INVENTOR(S) : Edward W. Janssen

It is certified that error appears in the above–identified patent and that said Letters Patent are hereby corrected as shown below:

Column 19, line 28, "disperion" should read -- dispersion --;

Column 19, line 49, "from" should read -- foam --;

Column 19, line 50, delete the parenthesis after "density";

Column 19, line 68, "disperion" should read -- dispersion --;

Column 20, line 17, after "set" insert -- time--;

Column 20, line 44, "th" should read -- the --;

Column 20, line 49, "uethane" should read -- urethane --.

Signed and Sealed this

Sixteenth Day of June 1981

[SEAL]

Attest:

RENE D. TEGTMEYER

Attesting Officer     Acting Commissioner of Patents and Trademarks